(12) United States Patent
Ramhorst

(10) Patent No.: US 9,126,243 B2
(45) Date of Patent: Sep. 8, 2015

(54) MAINTENANCE GLOVE

(71) Applicant: Bernd Ramhorst, Bielefeld (DE)

(72) Inventor: Bernd Ramhorst, Bielefeld (DE)

( * ) Notice: Subject to any disclaimer, the term of this patent is extended or adjusted under 35 U.S.C. 154(b) by 560 days.

(21) Appl. No.: 13/660,535

(22) Filed: Oct. 25, 2012

(65) Prior Publication Data

US 2013/0104283 A1    May 2, 2013

(30) Foreign Application Priority Data

Oct. 26, 2011 (DE) ...................... 20 2011 051 757 U

(51) Int. Cl.
| | | |
|---|---|---|
| *A41D 19/00* | (2006.01) | |
| *B25J 21/02* | (2006.01) | |
| *B08B 15/02* | (2006.01) | |
| *A41D 19/015* | (2006.01) | |

(52) U.S. Cl.
CPC ........ *B08B 15/026* (2013.01); *A41D 19/01594* (2013.01); *B25J 21/02* (2013.01); *A41D 19/0024* (2013.01)

(58) Field of Classification Search
CPC ........... B25J 21/02; B25J 21/00; B08B 15/02; B08B 15/026; A47L 13/18; A47K 7/02; A46B 5/04; A41D 13/08; A41D 13/081; A41D 19/00; A41D 19/0024; A41D 19/0027; A41D 19/0079; A41D 19/015; A41D 19/01594
USPC ......... 2/160, 16, 159, 161.6, 161.7, 163, 901; 362/103, 109, 119; 15/227
See application file for complete search history.

(56) References Cited

U.S. PATENT DOCUMENTS

| | | | | |
|---|---|---|---|---|
| 1,530,327 | A * | 3/1925 | Redlick | 401/7 |
| 2,061,219 | A * | 11/1936 | Wright | 401/7 |
| 2,075,850 | A * | 4/1937 | Johnson | 401/7 |
| 2,269,721 | A * | 1/1942 | Johnson | 401/7 |
| 2,405,154 | A * | 8/1946 | Logan | 401/7 |
| 2,663,890 | A * | 12/1953 | Sullins | 401/7 |
| 3,103,016 | A * | 9/1963 | Perlman | 2/270 |
| 3,337,279 | A * | 8/1967 | Reinhardt et al. | 312/1 |
| 3,391,406 | A * | 7/1968 | Lucas | 2/161.6 |
| 3,511,547 | A * | 5/1970 | Schwab et al. | 312/1 |
| 4,696,593 | A * | 9/1987 | Bayless | 401/7 |
| 4,812,700 | A * | 3/1989 | Natale | 312/1 |

(Continued)

FOREIGN PATENT DOCUMENTS

| | | |
|---|---|---|
| DE | 38 33 000 C2 | 5/1990 |
| DE | 41 23 014 A1 | 1/1993 |
| DE | 93 14 368 U1 | 12/1993 |
| DE | 693 16 900 T2 | 9/1998 |
| DE | 21 2007 000 042 U1 | 10/2009 |
| DE | 10 2008 041 521 A1 | 3/2010 |
| WO | 2007/132201 A1 | 11/2007 |

OTHER PUBLICATIONS

German Patent and Trademark Office Search Report, Dated Sep. 4, 2012.

*Primary Examiner* — Amy Vanatta
(74) *Attorney, Agent, or Firm* — Laurence A. Greenberg; Werner H. Stemer; Ralph E. Locher

(57) ABSTRACT

An arm-length glove made of a flexible material for performing maintenance work within sealed housings. An armhole-side end of which can be attached to a flange of a maintenance opening in a gas-tight manner and the hand end of which is freely movable, wherein a hand-grip is located in the hand end. The hand end is telescopically extendable. A camera and a light source are located at the hand end. Furthermore tools and/or sensors are also located at the hand end.

14 Claims, 3 Drawing Sheets

(56) References Cited

U.S. PATENT DOCUMENTS

| | | | |
|---|---|---|---|
| 5,299,243 A * | 3/1994 | Picco | 376/287 |
| 5,380,077 A | 1/1995 | Pueschner et al. | |
| 5,380,078 A * | 1/1995 | Baczkowski et al. | 312/1 |
| 5,816,676 A | 10/1998 | Koenen Myers et al. | |
| 6,902,289 B1 * | 6/2005 | Smith | 362/103 |
| 2010/0075587 A1 | 3/2010 | Hertfelder et al. | |
| 2011/0191935 A1 * | 8/2011 | Schneider | 2/160 |
| 2012/0025945 A1 * | 2/2012 | Yazadi et al. | 340/4.2 |

* cited by examiner

MAINTENANCE GLOVE

CROSS-REFERENCE TO RELATED APPLICATION

This application claims the priority, under 35 U.S.C. §119, of German application DE 20 2011 051 757.8, filed Oct. 26, 2011; the prior application is herewith incorporated by reference in its entirety.

BACKGROUND OF THE INVENTION

Field of the Invention

The invention relates to an arm-length glove made of a flexible material for performing maintenance work within sealed housings, an armhole-side end of which can be attached to a flange of a maintenance opening in a gas-tight manner and the hand end of which is freely movable.

Processing devices are known in which work can be carried out inside housings without the operative's hands coming into contact with the work pieces or substances being handled. Hence, published, non-prosecuted German patent application DE 41 23 014 A1, corresponding to U.S. Pat. No. 5,380,077, describes a processing device for processing precision work pieces, in which the operative is able to reach into the housing using gloves with a gas-tight connection to the work piece and take hold of the tools. The processing is observed through a viewing window. There are no tools provided on the glove.

German Patent DE 38 33 000 C2 describes a device for the gas-tight opening, cleaning and reclosing of a cleaning opening of a gas line sealed by a plug. The maintenance work can be performed using a glove with a gas-tight connection. It is not possible to observe the work being carried out. There are no tools provided on the glove either.

SUMMARY OF THE INVENTION

The problem addressed by the invention is that of disclosing a glove for carrying out maintenance work within sealed housings, in which the work can be observed even in the case of non-transparent housings and in which tools can be manipulated using the glove.

The proposed glove for carrying out maintenance work within sealed housings is produced as an arm-length glove made of a flexible material. This material may be a tear-proof textile material, for example, which may possibly be coated or interwoven with a suitable plastic layer.

The armhole-side end may be attached to a flange of a housing opening in a gas-tight manner, so that there can be no exchange of gases between the inside of the housing and the environment.

The hand end of the arm-length glove is freely movable and any work can be carried out using the hand.

The arm-length glove is characterized in that there is a hand-grip located in the hand end, with which the hand end can be freely moved. The hand end is telescopically extendable and can therefore be moved deep within the housing.

In order to observe the processing operations, a camera and a light source are provided at the hand end. The camera signal may be transmitted to an observation monitor.

Tools and/or sensors are provided at the hand end, which are required for the maintenance or processing operations. The tools include a suction pipe, a blow pipe and/or a liquid nozzle, which are also further extendable. Cleaning operations can be performed very effectively with these tools.

The operative is largely protected from the influences of conditions within the housing by the arm-length glove. Conversely, the inside of the housing is also largely protected from external environmental influences.

If the opening in the housing is favorably located, maintenance work is carried out in a comfortable working position. During a visual inspection, the operator simply positions the light source and the camera at the hand end of the arm-length glove and is thereby able to examine even poorly visible details.

The interior of large housings can be processed without having to be entered. Because the hand end of the arm-length glove is telescopically extendable, both close and remote points can be observed and processed.

The gas-tight attachment of the arm-length glove to the housing opening means that the most varied pressure conditions can prevail in the housing during working. This means that overpressure, vacuum or atmospheric pressure may exist, for example. These conditions can be measured by pressure and/or temperature sensors. A crack detector may also be provided. This means that the condition of the inside of the housing can be examined.

The tools may optionally also include a brush, pincers and/or a cleaning sponge. The brush may also be of a rotating configuration in this case, so that it is able to clean efficiently. The cleaning equipment may also include an ultrasound source for removing dirt.

Cleaning operations may therefore include: blowing out abrasive materials; sucking up dust, powder or liquid; spraying cleaning fluid; brushing off something; loosening dirt by ultrasound; and grabbing something with pincers.

Sensors for gases or for moisture are optionally provided at the hand end. Using these, it is possible to detect whether a maintenance operation has been successful. Hence, for example, it is possible to check whether the housing has been completely emptied.

A helmet monitor is advantageously used as the observation monitor. Using this, the operator can also observe the processes underway inside the housing during difficult working operations.

The various tools are connected to a cable pack which extends into the arm-length glove. Using the other hand, the operator can now further extend the tools or draw them back. In this case, the tube end concerned may be conducted linearly in guides. It is also possible for the tube ends to be configured in a spiral form, so that various distances can be covered.

Switches with which the tools can be controlled are advantageously located on the cable pack in the region of the other hand. In this way, the light source and camera can be switched on or off or the compressed air or suction tubes opened and closed.

A protective sleeve is optionally provided for the arm-length glove, which gathers up when the glove is immersed in the housing and is drawn over the glove again when the glove is removed from the housing. The environment is thereby protected from harmful substances from the housing or the hygiene within the housing is improved.

The opening on the housing for the arm-length glove is advantageously provided with a maintenance flap, which seals the housing in a manner free from dead space. The opening may also be an outlet opening for draining the housing.

The maintenance flap in this case is attached to a connection piece, which also has the flange for the arm-length glove.

This connection piece may also have a suction cup for the connection of a vacuum suction device, with which the housing can be vacuumed out.

Other features which are considered as characteristic for the invention are set forth in the appended claims.

Although the invention is illustrated and described herein as embodied in a maintenance glove, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
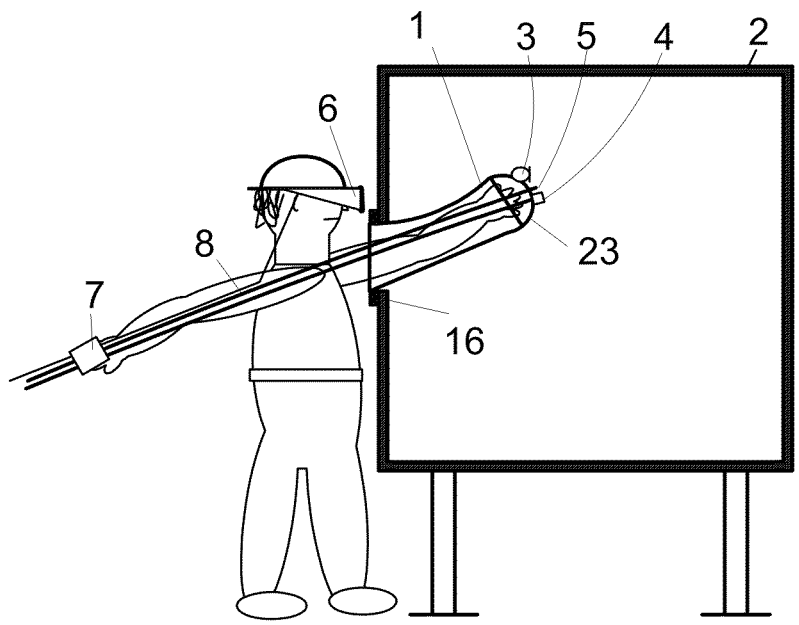
FIG. 1 is a schematic representation showing an arm-length glove according to the invention.

Referring now to the figures of the drawing in detail and first, particularly, to FIG. 1 thereof, there is shown a schematic representation of an application according to the invention of an arm-length glove 1. The arm-length glove 1 is attached in a gas-tight manner to a maintenance opening 16 of a housing 2 and a user reaches their hand inside the arm-length glove 1. By use of a hand-grip, a hand end 23 with a light source 3 and a camera 4 can be moved freely in the housing 2. Tube nozzles 5 also end at the front at the hand end 23. Movement can be observed via the user's helmet camera 6. The user grabs a bundle of tubes 8 with the other hand and is also thereby able to influence the depth of the movement in the housing. Furthermore, switches 7 may be provided on the bundle of tubes 8, with which the light source 3, camera 4 or tube nozzles are controlled.

Figure 2:
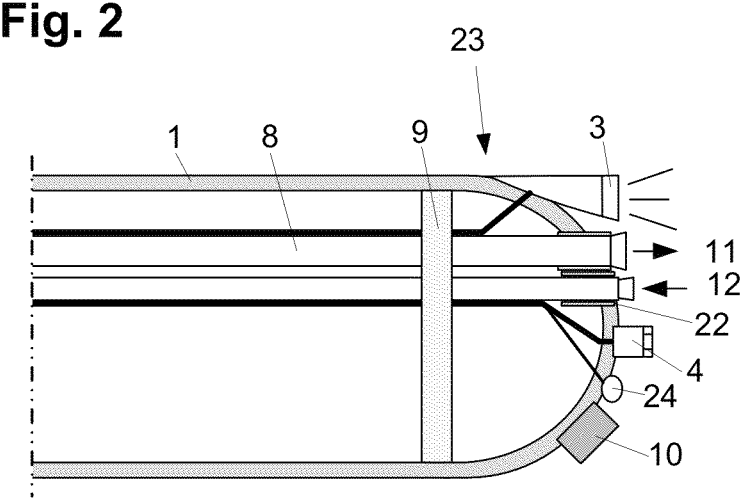
FIG. 2 is a cross-sectional view through the arm-length glove.

FIG. 2 shows a cross-section through an end of the arm-length glove 1, which is moved by use of a hand-grip 9. The light source 3 and the camera 4 are attached to an outside at the hand end 23. Sensors 24 are provided which can check the housing for gases or moisture. Furthermore, tools can be attached externally, such as a sponge 10 which is used for cleaning purposes.

A spray nozzle 11 and/or a suction nozzle 12 can be extended from the hand end 23 of the arm-length glove 1 via the bundle of tubes 8. The nozzles are held in guides 22 in a gas-tight manner, as different pressure conditions may prevail in the housing.

Figure 3:
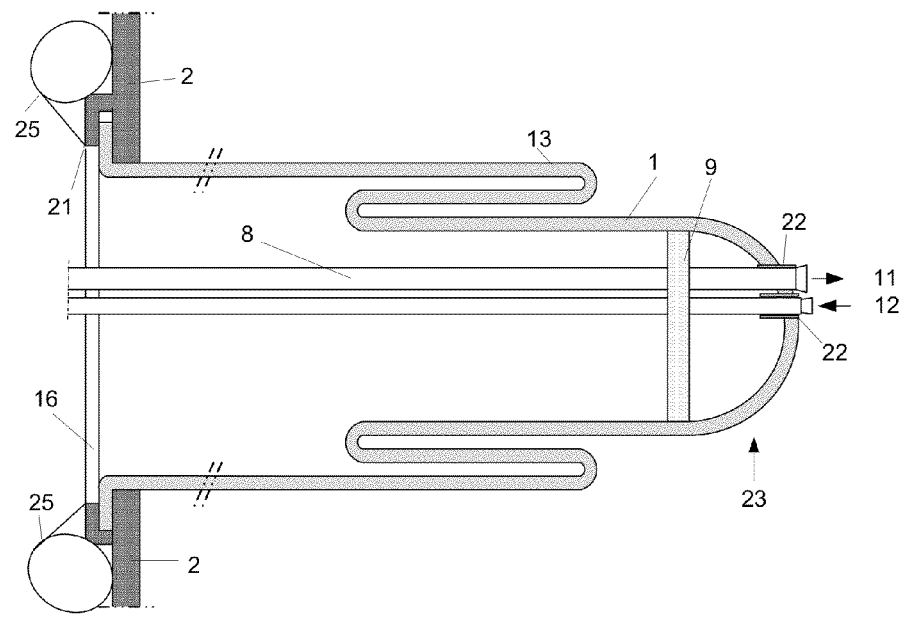
FIG. 3 is a cross-sectional view through a cuff and an attachment of the arm-length glove.
Figure 4:
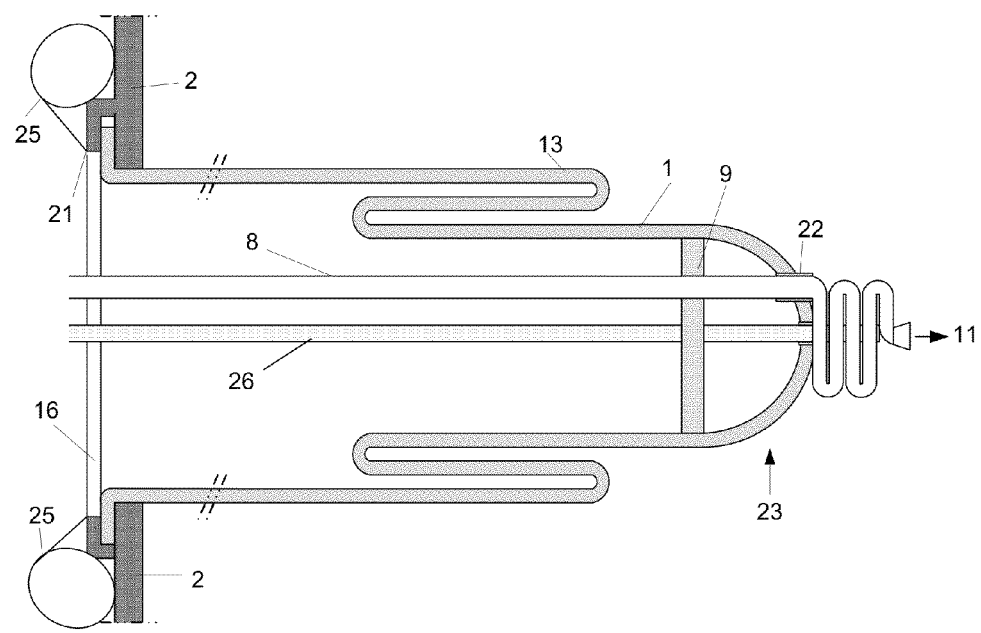
FIG. 4 is a cross-sectional view through the cuff with a spiral-shaped tube.

In FIGS. 3 and 4 a cross-section through the arm-length glove 1 is shown which is attached to the maintenance opening 16 of the housing 2 in a gas-tight manner by a flange 21.

A protective sleeve 25 is also rolled up or pushed together at the flange 21, the protective sleeve 25 extends over the arm-length glove 1 when the glove is pulled out.

The arm-length glove 1 is pushed together in the form of a cuff 13 and can be pushed apart with the help of the hand-grip 9. The tubes for the injection nozzle 11 and the suction nozzle 12 are combined in the bundle of tubes 8 and can thereby be pushed outwardly from the hand end 23. To achieve this, the spray nozzle 11 and the suction nozzle 12 are held in gas-tight guides 22. As shown in FIG. 4, the tube end with the injection nozzle 11 may also be arranged in spiral form and pushed out by a driving rod 26.

Figure 5:
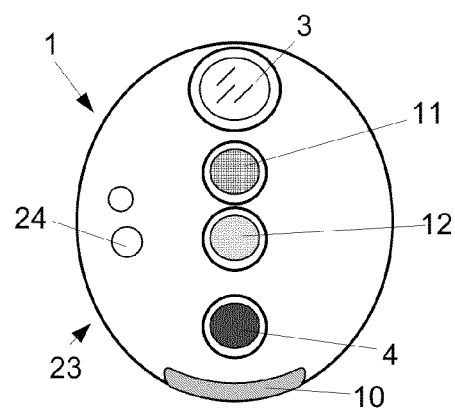
FIG. 5 is a front view of the arm-length glove.

FIG. 5 shows a front view of the arm-length glove 1. Possible positions of the light source 3, the camera 4, the sponge 10 and also the injection nozzle 11 and the suction nozzle 12 are shown. However, entirely different tools may also be attached to the hand end 23 of the arm-length glove 1.

Figure 6:
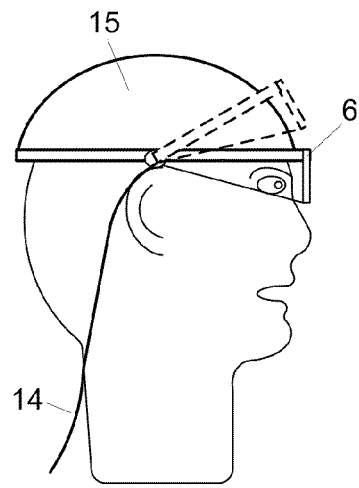
FIG. 6 is an illustration showing a helmet camera.

The head of a user with the helmet monitor 6 is illustrated in FIG. 6.

It is pivotably attached to the helmet 15, so that it can be used when necessary during work. A monitor cable 14 is also conducted in the bundle of tubes.

Figure 7:
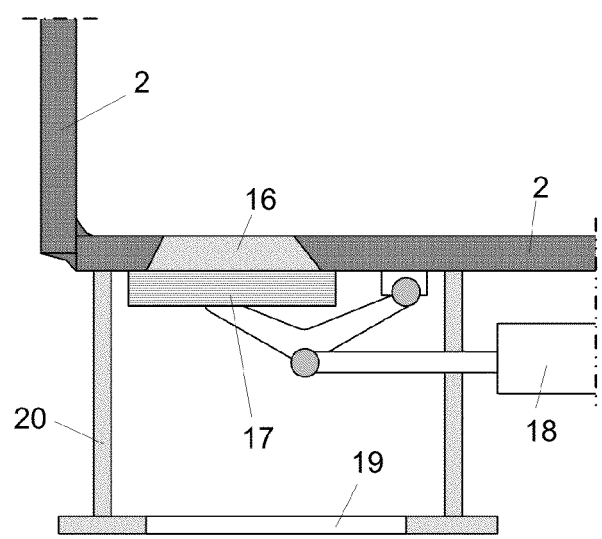
FIG. 7 is a sectional view of a housing with a maintenance opening.

FIG. 7 shows a detail of the housing 2 with the maintenance opening 16, which can be sealed free from dead space using a maintenance flap 17. A maintenance cylinder 18 is used for opening and closing. A suction cup may also be connected to the maintenance opening 16, by which the housing 2 can be sucked empty. An arm-length glove may also be introduced into the housing 2, however, by a connection piece 20 with the connection piece opening 19.

REFERENCE NUMBER LIST

1 Arm-length glove
2 Housing
3 Light source
4 Camera
5 Tube nozzle
6 Helmet monitor
7 Switch
8 Bundle of tubes
9 Hand-grip
10 Sponge
11 Injection nozzle
12 Suction nozzle
13 Cuff
14 Monitor cable
15 Helmet
16 Maintenance opening
17 Maintenance flap
18 Flap cylinder
19 Connection piece opening
20 Maintenance connection piece
21 Flange
22 Guide
23 Hand end
24 Sensors
25 Protective sleeve
26 Driving rod

The invention claimed is:
1. An arm-length glove, comprising:
a glove body made of a flexible material for performing maintenance work within sealed housings, said glove body having an armhole-side end for attaching to a flange of a maintenance opening in a gas-tight manner and an hand end being freely movable and telescopically extendable;

a hand-grip disposed in said hand end;
a camera disposed at said hand end;
a light source disposed at said hand end; and
elements selected from the group consisting of tools and sensors disposed at said hand end.

2. The arm-length glove according to claim 1, wherein said tools are selected from the group consisting of a suction pipe, a blow pipe and a liquid nozzle, which are also all further extendable.

3. The arm-length glove according to claim 1, wherein said tools are selected from the group consisting of a rotating brush, pincers and a cleaning sponge.

4. The arm-length glove according to claim 1, wherein said sensors sense gases or moisture and are disposed at said hand end.

5. The arm-length glove according to claim 1, wherein said sensors are selected from the group consisting of temperature sensors and pressure sensors disposed at said hand end.

6. The arm-length glove according to claim 1, further comprising an ultrasound source for removing dirt and disposed at said hand end.

7. The arm-length glove according to claim 1, further comprising a crack detector disposed at said hand end.

8. The arm-length glove according to claim 1, wherein said camera is connected to a helmet monitor.

9. The arm-length glove according to claim 1, further comprising a bundle of tubes, said tools are connected to said bundle of tubes with which said tools can be further extended.

10. The arm-length glove according to claim 9, further comprising gas-tight guides and said tools are disposed on said bundle of tubes which can be pushed out through said gas-tight guides.

11. The arm-length glove according to claim 9, wherein said tools are disposed on said bundles of tubes and are found in a spiral form at said hand end and can be pushed further forward.

12. The arm-length glove according to claim 9, further comprising switches for individual ones of said tools and are disposed on said bundle of tubes.

13. The arm-length glove according to claim 1, further comprising a protective sleeve which is drawn over said glove body when the arm-length glove is removed from the housing.

14. The arm-length glove according to claim 1, further comprising:
a connection piece disposed on the housing; and
a maintenance flap disposed on the housing for sealing the housing internally in a manner free from dead space.

* * * * *